United States Patent Office 3,038,424
Patented June 12, 1962

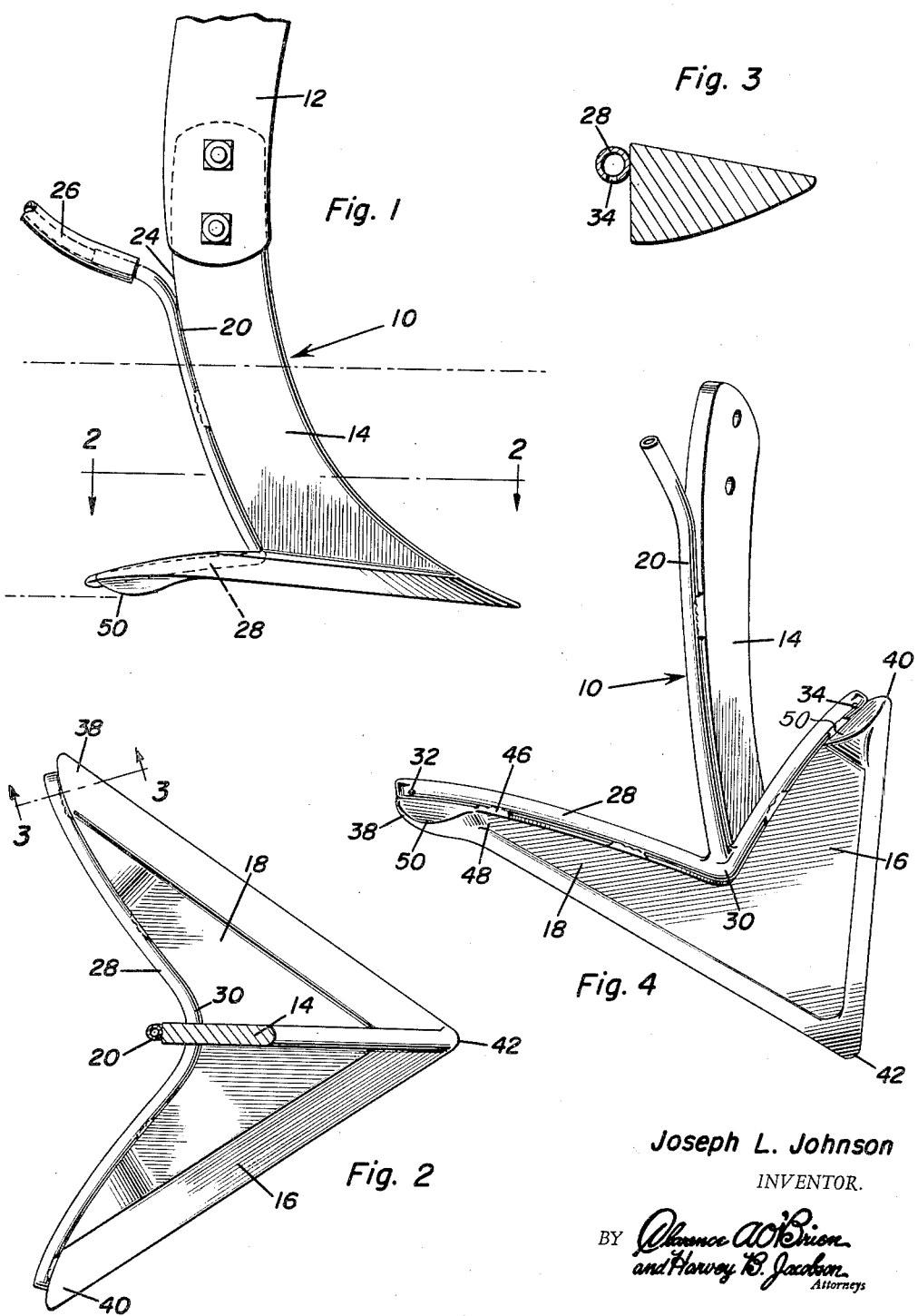

3,038,424
SWEEP TYPE LIQUID FERTILIZER TINE
Joseph L. Johnson, Shickley, Nebr.
Filed Jan. 26, 1960, Ser. No. 4,674
2 Claims. (Cl. 111—7)

This invention relates to devices for applying liquid substance to soils and more particularly to an earth working tool provided with means for distributing liquid in spaced bands to the soil in the wake of the tool.

A particularly difficult problem encountered in soil treatment is found in the distribution of anhydrous ammonia. Anhydrous ammonia in its natural state is a gas. Under pressure it turns to a liquid, and it is the liquid that is used commercially as nitrogen fertilizer. Anhydrous ammonia is 82% nitrogen, and it is the most inexpensive form of nitrogen fertilizer now available to farmers.

Anhydrous ammonia is usually applied to the soil at whatever width is desired. For corn, the spacing is usually 40 inches. For small grain, 16 to 20 inch spacing is preferable. High rates of nitrogen are needed for corn production and as the nitrogen fertilizer is applied in bands 40 inches apart, a high concentration of ammonia in each band results. Therefore, the invention obtains an advantageous use of a sweep type tine for these reasons.

(1) The sweep type tine splits the ammonia into the bands. This will reduce the high pH and high concentration of ammonia and reduce the possibility of stunting the growth of young plants.

It is possible to use 20 inch spacing and so reduce the concentration, however, because of previous crop residue this is difficult to accomplish.

(2) In sandy soils, which have less ammonia holding capacity than the clay loam soils, a larger amount of ammonia could be applied at one application.

(3) The sweep type tine will seal more readily. As the ammonia is emitted from the tip of the wing its route of escape is further and more difficult than if it were emitted at some other point where it would travel straight up, directly behind the shank part of the tine.

In use, the wing is twisted to travel parallel with the surface of the ground while the nose is ponted down for suction. This gives a smaller dimension near the heel of the sweep wing and thereby disturbs the ground as little as possible at this point. The small heel is directly ahead of the point where the ammonia is emitted, and provides space into which the ammonia is emitted. This heel also prevents clogging.

The side of the tine has a straight edge or continuous slope and the vertical shank has a curved leading edge or a variable slope. This edge is rounded and smooth so that the previous crop residue will be pushed up this slope, become unbalanced and fall off on the surface of the ground. This residue aids in sealing as the shank stays clean.

Accordingly, an object of the invention is to provide means on a sweep type earth working tool to split the ammonia into two bands thereby reducing the high pH and high concentration of ammonia. The sweep type tine actually spreads the ammonia into two bands and does not rely on theoretical cracks or a tunnel formed by a blade for the ammonia to be discharged into.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a sweep type liquid fertilizing tine;

FIGURE 2 is a sectional view taken on the line 2—2 of FIGURE 1;

FIGURE 3 is a sectional view showing a tine tip taken on the line 3—3 of FIGURE 3; and FIGURE 4 is a perspective view of the tine.

In the accompanying drawing there is an illustration of a sweep type tine 10 suspended from a hanger 12 which, of itself, is conventional. The tine is made of a shank 14 and two wings 16 and 18 suitably connected to the tine, i.e., either by welding construction, by bolting or by the use of other conventional fastening expedients.

A conductor 20, for instance, a tube, is fitted flush against the rear edge 24 of tine 14, and it is welded or otherwise secured in place. Flexible hose 26 diagrammatically represents a source of anhydrous ammonia under pressure. The conductor 20 is connected to a manifold 28, and the manifold is secured along the rear edge of the wings 18 and 16, respectively. The shape of the manifold, when viewed from above, follows the essentially V-shaped, but smoothly curved, rear edges of the wings 16 and 18. Accordingly, the center or apex part 30 of the manifold which forms a juncture with conduit 20, is rounded. Discharge openings 32 and 34 are directed downwardly, and they are located adjacent to the closed ends of the manifold.

Over-all dimensions of a typical sweep tine 10 are 12½ inches from wing tip 38 to wing tip 40, 12½ inches from the point 42 formed at the juncture of the forward edges of the two wings to a perpendicular line projected from wing tip 38 to wing tip 40, and 12½ inches from the apex part of manifold to the top of the shank 14. The design or shape of the wing tips is of utmost importance since it provides the capability to seal the ammonia under the surface of the ground, indicated by the upper horizontal dash-dot line in FIGURE 1 of the drawing, and thus permits the ammonia to be split into two bands. When viewed directly ahead of the sweep tine, i.e., as if the tine were traveling toward the person viewing the tine, the wing tips will be shown to be twisted (FIGURE 1 showing the tine from the side) to travel parallel with the surface of the ground, as indicated by the lower dash-dot line in FIGURE 1 of the drawing, while the nose 42 is pointed down for suction. This provides a smaller dimension between the upper and lower surfaces 46 and 48 (FIGURE 4) and thereby disturbs the ground as little as possible at this point. The small heel 50 (FIGURE 1) is directly ahead of the discharge opening 32 which trails it and where the ammonia is emitted and provides space for the ammonia to be discharged. The heel 50 also prevents clogging of discharge opening 32. The build-ups for the heels 50 are below the wing tips, leaving the upper surfaces of said wing tips smooth and unobstructed. Since the tine is symmetrical about a vertical plane when viewed as shown in FIGURE 1, both sides of the tine are the same.

When viewed from the side, the tine has a gentle slope at the leading edge of the shank, and this edge is rounded and smooth so that the previous crop residue will be pushed up the slope, become unbalanced and fall off onto the surface of the ground. This residue aids in sealing the ammonia in the ground.

In practical use the tine is attached to a suitable support, and the hose 26 is attached to a source of anhydrous ammonia under pressure. The construction and arrangement is such that as the tool travels forwardly through the soil, the anhydrous ammonia is uniformly discharged at points immediately behind the wing tips and the heels located therebeneath. The heels 50 leave temporary tunnels for the fertilizer and prevent clogging of the discharge openings or ports 32 and 34.

Many tines have sharp leading edges on the vertical mid-section of the blades. These sharp leading edges wear jagged and accumulate roots which in effect widen the blade and enlarge the track made by the blade as it travels through the ground. This makes it difficult for the soil to roll behind the subsoil tool and therefore difficult to hold the ammonia gas in the soil. The rounded edge at the front of shank 14 solves this problem. Further, it slopes rearwardly and upwardly from the nose so that previous crop roots will be lifted up to the surface of the ground by the forward motion of the tine through the soil.

The wings or sweep part of the tine are sharpened on the leading edge. However, because of the steep slope from the nose 42 to the tip of the wing, roots will not accumulate. Also, the sweep part of the tine travels through soil which is much more compact than the top soil through which the vertical shank part of the tine passes.

A large portion of the operators who apply anhydrous ammonia into the soil use five applicator tines. Considering the width of a machine with five applicator blades, we find that gauge wheels are usually used at the outer end of the tool bar to maintain the proper depth of all five blades.

In actual application in the field it has been found that the surface of the soil is seldom smooth. When a gauge wheel rolls over a bump it causes the outer blade to be lifted. So we not only have a forward horizontal movement, but on rough ground, considerable vertical movement. For this reason, the wing of the sweep type tine is brought to a rather narrow tip.

The narrow tip when lifted does not in turn lift as much soil as a wide wing and therefore does not create a lot of loosened soil through which the ammonia may escape.

A three applicator blade machine is usually without gauge wheels and relies on the wheels of the tractor or the wheels of the tool bar carrier, whichever the case may be, to keep it level. In either case there is much more weight on these wheels and they do not tend to hop over small bumps.

The sharpened edges of the sweep are hard surfaced on the underside as is the heel which is under the wing tip. Also, the leading edge of the vertical shank is hard surfaced. This hard surfacing can be any good hard surfacing material and does increase the life of the tine.

The foregoing is considered as illustrative only of the principles of the invention. Further, since numerous modifications and changes may readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An earth-working tool comprising a vertical shank, a generally V-shaped substantially horizontal sweep on the lower end of said shank, said sweep including a front nose portion and a pair of rearwardly divergent wings terminating in tip portions, depending heel means integral with the undersides of said tip portions positioned for tunneling the soil as they travel therethrough and a generally V-shaped fluid fertilizer discharging manifold affixed to the rear edge of the sweep, said manifold terminating in closed end portions located behind the tip portions and having therein downwardly directed outlet ports positioned to discharge the fertilizer in the wakes of the heels.

2. The combination of claim 1, wherein said tip portions are twisted and oriented to travel parallel with the surface of the earth as the tool passes therethrough.

References Cited in the file of this patent

UNITED STATES PATENTS

| | | |
|---|---|---|
| 461,537 | Lindgren | Oct. 20, 1891 |
| 924,228 | Hitchings | June 8, 1909 |
| 1,630,585 | Simons | May 31, 1927 |
| 1,908,903 | Kovac | May 16, 1933 |
| 2,598,121 | Hannibal | May 27, 1952 |
| 2,619,054 | Bell | Nov. 25, 1952 |
| 2,684,617 | Johnston | July 27, 1954 |
| 2,834,446 | Wade | May 13, 1958 |
| 2,842,077 | Morrison | July 8, 1958 |

FOREIGN PATENTS

| | | |
|---|---|---|
| 530,673 | Canada | Sept. 25, 1956 |